United States Patent [19]

Farr

[11] Patent Number: 5,784,232
[45] Date of Patent: Jul. 21, 1998

[54] MULTIPLE WINDING SENSING CONTROL AND PROTECTION CIRCUIT FOR ELECTRIC MOTORS

[75] Inventor: James B. Farr, Ann Arbor, Mich.

[73] Assignee: Tecumseh Products Company, Tecumseh, Mich.

[21] Appl. No.: 868,199

[22] Filed: Jun. 3, 1997

[51] Int. Cl.⁶ .............................. H02H 7/00; H02H 5/04
[52] U.S. Cl. ........................ 361/22; 361/23; 361/24; 361/25; 361/27; 361/30; 361/103; 361/106
[58] Field of Search ........................... 361/22, 23, 24, 361/25, 27, 30, 31, 33, 103, 106

[56] References Cited

U.S. PATENT DOCUMENTS

| | | | |
|---|---|---|---|
| 3,546,531 | 12/1970 | Miner | 317/13.3 |
| 3,581,480 | 6/1971 | O'Connor | 56/11.9 |
| 3,585,451 | 6/1971 | Day | 317/13 |
| 3,646,396 | 2/1972 | Fischer | 317/13 |
| 3,660,718 | 5/1972 | Pinckaers | 317/13 |
| 3,676,989 | 7/1972 | Slayton | 56/10.5 |
| 3,742,303 | 6/1973 | Dageford | 317/13 |
| 3,777,240 | 12/1973 | Plouffe | 317/13 |
| 3,946,574 | 3/1976 | Portera | 62/158 |
| 3,965,396 | 6/1976 | Tyler | 317/42 |
| 4,017,778 | 4/1977 | Koch | 318/473 |
| 4,021,700 | 5/1977 | Ellis-Anwyl | 361/28 |
| 4,028,736 | 6/1977 | Willson et al. | 361/29 |
| 4,041,540 | 8/1977 | Kampf | 361/24 |
| 4,195,254 | 3/1980 | Gurwicz | 318/334 |
| 4,265,091 | 5/1981 | Kobayashi | 62/126 |
| 4,281,358 | 7/1981 | Plouffe | 361/22 |
| 4,319,298 | 3/1982 | Davis | 361/24 |
| 4,333,302 | 6/1982 | Thomas | 56/10.5 |
| 4,494,162 | 1/1985 | Eyler | 361/29 |
| 4,507,713 | 3/1985 | Hsieh | 361/92 |
| 4,510,547 | 4/1985 | Rudich | 361/22 |
| 4,541,029 | 9/1985 | Ohyama | 361/31 |
| 4,683,515 | 7/1987 | Beihoff | 361/106 |
| 4,722,019 | 1/1988 | Pohl | 361/22 |
| 4,806,839 | 2/1989 | Nagato | 318/798 |
| 4,939,437 | 7/1990 | Farag | 318/473 |
| 5,176,007 | 1/1993 | Komatsu | 62/193 |
| 5,222,009 | 6/1993 | Scharnick | 361/28 |
| 5,283,708 | 2/1994 | Waltz | 361/93 |
| 5,305,234 | 4/1994 | Markus | 364/550 |
| 5,345,126 | 9/1994 | Bunch | 310/68 |
| 5,347,821 | 9/1994 | Oltman | 62/84 |
| 5,463,874 | 11/1995 | Farr | 62/126 |
| 5,488,834 | 2/1996 | Schwarz | 62/126 |
| 5,543,996 | 8/1996 | Nakago | 361/90 |
| 5,585,990 | 12/1996 | Manning | 361/25 |

FOREIGN PATENT DOCUMENTS 2067858  7/1981  United Kingdom.

*Primary Examiner*—Jeffrey A. Gaffin
*Assistant Examiner*—Kim N. Huynh
*Attorney, Agent, or Firm*—Baker & Daniels

[57] ABSTRACT

The present invention involves control and protection circuit for a compressor motor which includes an inductively activated contactor for controlling the flow of current to the compressor motor. The circuitry of the present invention includes a plurality of current detectors associated with each phase winding of the compressor motor for sensing the current in each phase winding. The sensed currents are combined in a predetermined manner and used to provide protection against an overcurrent condition, single phase operation and light loading condition. Additional detector circuits are also connected to the present control and protection circuit to provide protection against high temperature in the compressor motor windings, high temperature in various component of the compressor motor, and undervoltage in the power supply. A temperature detector disposed inside the cooling chamber also provides for cycling of the compressor motor to maintain the temperature in the cooling chamber at within a predetermined temperature range. The inductive coupling is activated by a protection timer and an oscillator. The protection timer deactivates the oscillator when a trip signal is received from the detector circuits. A predetermined time delay is provided by the protection timer to prevent spurious trips of the compressor motor.

22 Claims, 8 Drawing Sheets

MULTIPLE WINDING SENSING CONTROL AND PROTECTION CIRCUIT FOR ELECTRIC MOTORS

BACKGROUND OF THE INVENTION

1. Field of the Invention

The present invention relates to a control and protection circuit for electric motors and more particularly to a control and protection circuit for activating and deactivating a compressor motor in a refrigeration system.

2. Description of the Related Art

Motor control and protection devices for electric motors generally include electro-mechanical or solid state electronic devices for activating and deactivating the electric motor based on various operating conditions and the loading on the electric motor. Generally, the motor protection devices sense the current in the motor and interrupt current to the motor when the current exceeds a predetermined threshold.

A method of interrupting the current in the event of an overcurrent condition uses a snap disc placed in series with the windings of the compressor motor. The snap disc is composed of bimetallic layers which are in physical contact with the contact points which close the circuit. Typically, a resistive heating element which heats the bimetallic layers is connected in series with the contact point such that when the heat generated by current passing through the resistive element exceeds a predetermined threshold, the different metals of the bimetallic layer expand at different rates, causing the disc to bend and break the connection to the contact points. Another arrangement involves placing the snap disc device in close proximity to the motor so that the snap disc device may open and close in response to the temperature of the compressor motor.

However, the snap disc arrangement includes a number of disadvantages including: long actuation delay from the time the overcurrent condition occurs and the time the snap disc interrupts the current, imprecise setpoints, non-dynamic response, inability to account for different environments or motor load conditions, and long restoration time until the snap disc returns to the original condition and re-establishes electrical contact.

Other methods of controlling current to an electric motor include using solid state devices which permit or interrupt current from an AC power source to the motor. Control circuits using such devices have the advantage of precision, reliability and self-regulation. Along with such arrangements, it is advantageous to inductively couple the control circuit with the power output stage. The power output stage regulates the application of power to the motor. Such inductive coupling provides the benefit of electrical isolation of the control logic circuit and the power output circuit thereby reducing the effect of noise in the system. One method of inductive coupling the control circuit with the power output stage is disclosed in U.S. Pat. No. 5,463,874, "Inductively Activated Control and Protection Circuit for Refrigeration Systems," issued Nov. 7, 1995, which is assigned to the assignee of the present invention, the disclosures of which are explicitly incorporated by reference. However, the inductively coupled control circuit cited above does not provide protection against single phase operation or light loading conditions.

Therefore, what is needed is an inductively coupled control and protection circuit for controlling a compressor motor which incorporates protection against single phase operation and light load conditions, as well as overcurrent conditions.

What is also needed is an inductively coupled control and protection circuit for controlling a compressor motor which incorporates a number of protective features associated with high temperature conditions and abnormal power supply conditions.

What is also needed is an inductively coupled control and protection circuit which minimizes the required number of components to provide an inexpensive control and protection circuit in a compact, efficient package.

SUMMARY OF THE INVENTION

The present control and protection circuit provides an inductively coupled circuit which incorporates a number of control and protective features in a compact, economical, and efficient package. The present control and protection circuit is operatively coupled to a contactor which controls the flow of current from an AC power source to a compressor motor. The circuitry of the present invention monitors current on each motor winding individually and provides protection against a variety of conditions including: overcurrent, single phase operation, light loading condition corresponding to loss of refrigerant, high motor winding temperature, high motor component temperature, low power supply voltage and low oil level. The circuitry of the present invention also includes a temperature detector located in a temperature controlled chamber for activating and deactivating the compressor motor to maintain the temperature in the chamber in a predetermined temperature range. The present control and protection circuit is particularly suited for use with motors having a plurality of windings.

The circuitry of the present invention includes a current detector circuit having a plurality of current detectors, each current detector associated with one of the motor windings and having a capacitor which provides a voltage level corresponding to the current in the respective winding. The output of the current detectors are combined to provide a combined current output to provide a combined current level signal. The combined current level signal is compared with a current threshold level to provide overcurrent protection. The output of the current detectors are also connected to a single phase detector circuit and light load detector circuit which provide protection against single phase operation and light loading conditions, respectively. The circuitry of the present invention also includes temperature detector circuits respectively associated with the compressor motor winding, selected compressor components and the interior of the chamber to be cooled. A low voltage detector circuit is also connected to the power supply voltage.

The circuitry of the present invention also includes an inductive coupling arrangement comprising a protection timer, an oscillator and an inductive coupling circuit. The protection timer is connected to the plurality of detector circuits and disables the oscillator when a trip signal is received from any of the detector circuits. The protection timer disables the oscillator circuit after a predetermined time delay when the trip signal is received from the current detector circuit, single phase detector circuit, light loading detector circuit, compressor motor temperature detector circuit, compressor component temperature detector circuit, and power supply undervoltage detector circuit. The protection timer also automatically restarts the compressor motor after a predetermined time delay unless the trip signal persists or a new trip signal is received.

The oscillator circuit provides current pulses to the primary windings of a transformer to provide inductive coupling with a solid state switch which controls the state of the contactor. When the oscillator circuit is activated, the solid state switch closes the contactor to provide current to the compressor motor windings. When the oscillator circuit is deactivated, the solid state switch opens the contactor to interrupt current to the compressor motor windings.

The present invention further provides for cycling the compressor motor as necessary to maintain a predetermined temperature in the chamber to be cooled, based on a temperature signal from the temperature sensor disposed in the chamber.

BRIEF DESCRIPTION OF THE DRAWINGS

The above mentioned and other features and objects of this invention, and the manner of attaining them, will become more apparent and the invention itself will be better understood by reference to the following descriptions of the embodiments of the invention taken in conjunction with the accompanying drawings, wherein.

Figure 1:
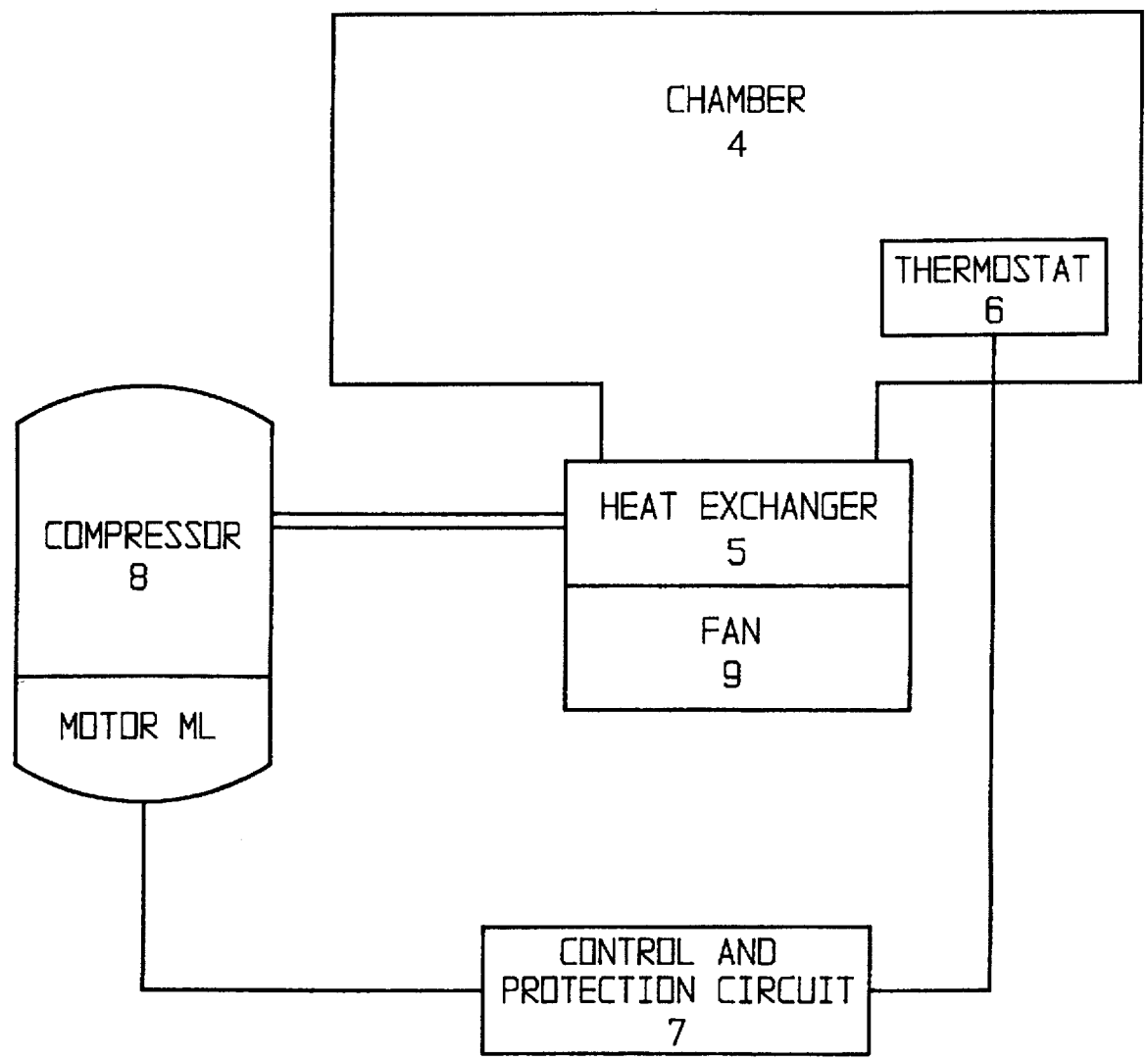
FIG. 1 is a schematic diagram of a refrigeration system having the control and protection circuit of the present invention.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrate embodiments of the invention, in several forms, and such exemplifications are not to be construed as limiting the scope of the invention in any manner.

DETAILED DESCRIPTION OF THE INVENTION

The embodiments disclosed below are not intended to be exhaustive or limit the invention to the precise forms disclosed in the following detailed description. Rather, the embodiments are chosen and described so that others skilled in the art may utilize their teachings.

Referring now to the drawings, FIG. 1 illustrates a schematic diagram of a refrigeration system including control and protection circuit 7 which is electrically connected to compressor motor M1 of compressor 8 and thermostat 6 located inside chamber 4. Compressor 8 circulates the refrigerant through heat exchanger 5 to provide cooling air to temperature controlled chamber 4 by the operation of fan 9. Control and protection circuit 7 senses the condition and loading of compressor motor M1 to activate and deactivate compressor motor M1 as necessary. Control and protection circuit 7 also receives an indication of the temperature in chamber 4 and activates and deactivates compressor motor M1 as necessary to control the temperature in chamber 4.

The present control and protection circuit 7 may also be adapted to control fan 9. Fan 9 can be connected to run when compressor 8 is running. This is accomplished by connecting fan 9, which is normally a single phase motor, to operate on one leg of the 3-phase supply. Another mode of operation consists of a continuously operating fan 9, wherein fan 9 connected to run whenever the main power switch for the refrigeration system is in the ON position.

Figure 2:
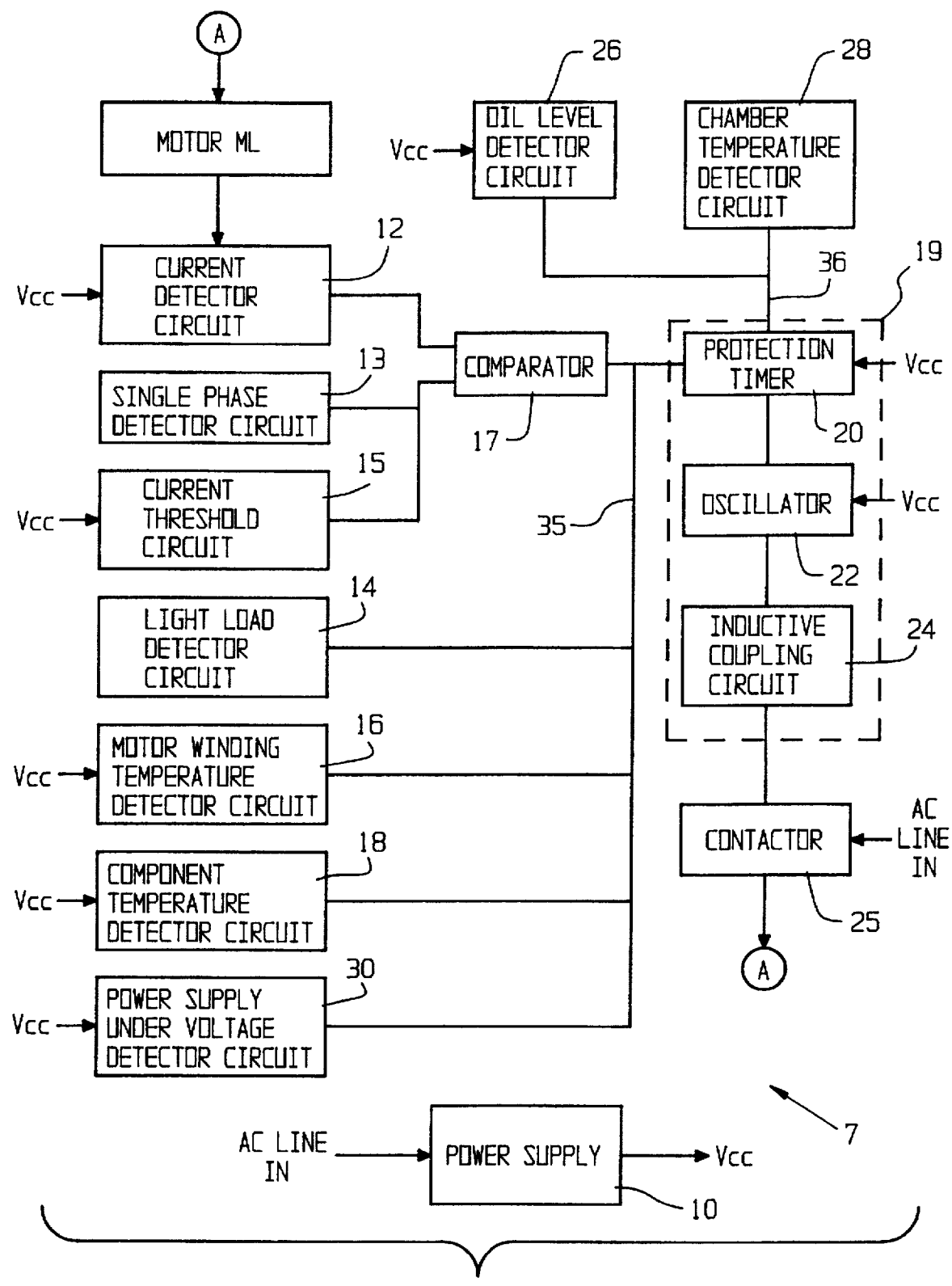
FIG. 2 is a block diagram of the control and motor protection circuit of the present invention.

FIG. 2 illustrates a block diagram of control and protection circuit 7. Control and protection circuit 7 includes current control circuit 19 which controls the state of contactor 25 to permit or interrupt the flow of current to compressor motor M1. Current control circuit 19 comprises protection timer 20, oscillator 22 and inductive coupling circuit 24. Protection timer 20 is adapted to receive trip signals from a plurality of detector circuits which detect the condition of compressor motor M1 and the temperature in chamber 4. When protection timer 20 receives a trip signal, protection timer 20 deactivates oscillator 22 which inhibits the output of inductive coupling circuit 24 and opens contactor 25 to interrupt current to compressor motor M1.

Protection timer 20 receives trip signals from the various detectors through signal lines 35 and 36. Current detector circuit 12 and single phase detector circuit 13 provide a trip signal on signal line 35 via comparator 17. Light load detector circuit 14, motor temperature detector circuit 16, component temperature detector circuit 18 and power supply undervoltage detector circuit 30 also provide a trip signal on signal line 35. Oil level detector circuit 26 and chamber temperature detector circuit 28 provide a trip signal on signal line 36.

A trip signal received on signal line 35 interrupts the current through compressor motor M1 after a predetermined time delay. The predetermined time delay provides protection against spurious trips due to noise or transient conditions. A trip signal received on signal line 36 interrupts the current through compressor motor M1 without a time delay. The trip signal from oil level detector circuit 26 deactivates compressor motor M1 without a time delay because the dangerous conditions created by loss of lubricating oil require immediate deactivation of compressor motor M1. The trip signal from chamber temperature detector circuit 28 cycles the compressor motor M1 to control the temperature in chamber 4 during routine operation of the present refrigeration system.

Current through compressor motor M1 is sensed by current detector circuit 12 which includes a current detector associated with each phase winding of compressor motor M1. Each current detector includes a current sensing winding disposed about a motor winding and provides a current level signal corresponding to the current in the respective winding of compressor motor M1. The current level signals are used to provide protection against overcurrent conditions, single phase operation and light loading conditions.

For protection against an overcurrent condition, a combined current level signal, in this case the average of the current level signals, is provided to comparator 17. Comparator 17 compares the combined current level signal with a predetermined current threshold level provided by current threshold circuit 15 and provides a trip signal when the combined current level signal exceeds the predetermined current threshold level.

For protection against single phase operation, single phase detector circuit 13 receives the current level signals from current detector circuit 12 and adjusts the predetermined current threshold level provided to comparator 17 when single phase operation is detected. Protection against single phase operation is required since the loss of current in one or more phase windings will result in a current increase in the remaining phase windings. Since the overcurrent protection circuit uses a combined current level signal, a high current in one phase and a very low current in another phase may not trigger an overcurrent trip signal. If compressor motor M1 is not deactivated, damage may result to the winding carrying the high current due to the high temperatures generated.

Light load detector circuit 14 also receives the current level signals from the current detectors of current detector circuit 12 and protects compressor motor M1 from a light load condition which indicates a loss of refrigerant condition. A loss of refrigerant condition may damage the compressor motor because vacuum conditions may be created thereby resulting in loss of cooling and excessive motor and compressor heating. Thus, a loss of refrigerant condition is dangerous even though the current in the motor windings may be relatively low.

Motor temperature detector circuit 16 provides protection against high motor winding temperature. Component temperature detector circuit 18 provides protection against high temperature in selected portions of compressor motor M1. Power supply undervoltage detector circuit 30 senses the voltage provided by power supply 10 and deactivates compressor motor M1 when the power supply voltage is below a predetermined voltage threshold level. Oil level detector circuit 26 provides protection against loss of lubricating oil to compressor motor M1. Chamber temperature detector circuit 28 provides for the cycling of compressor motor M1 to maintain a predetermined temperature range in chamber 4. Finally, power supply 10 is connected to the AC input line and provides regulated DC voltage to the various detectors and control circuits of control and protection circuit 7 as required.

Figure 3A:
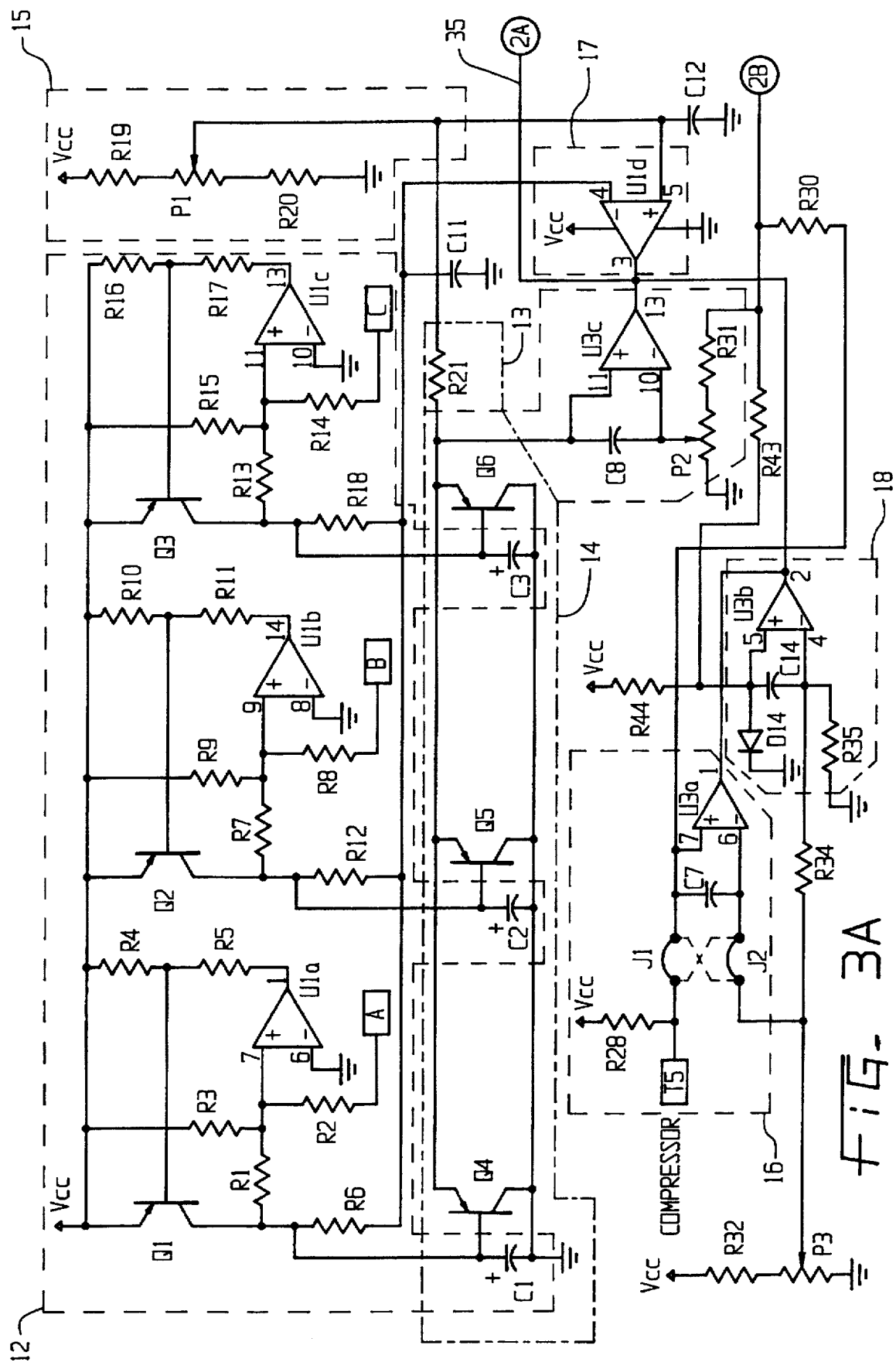
FIGS. 3A–C form a schematic circuit diagram of the control and protection circuit of the present invention.
Figure 3B:
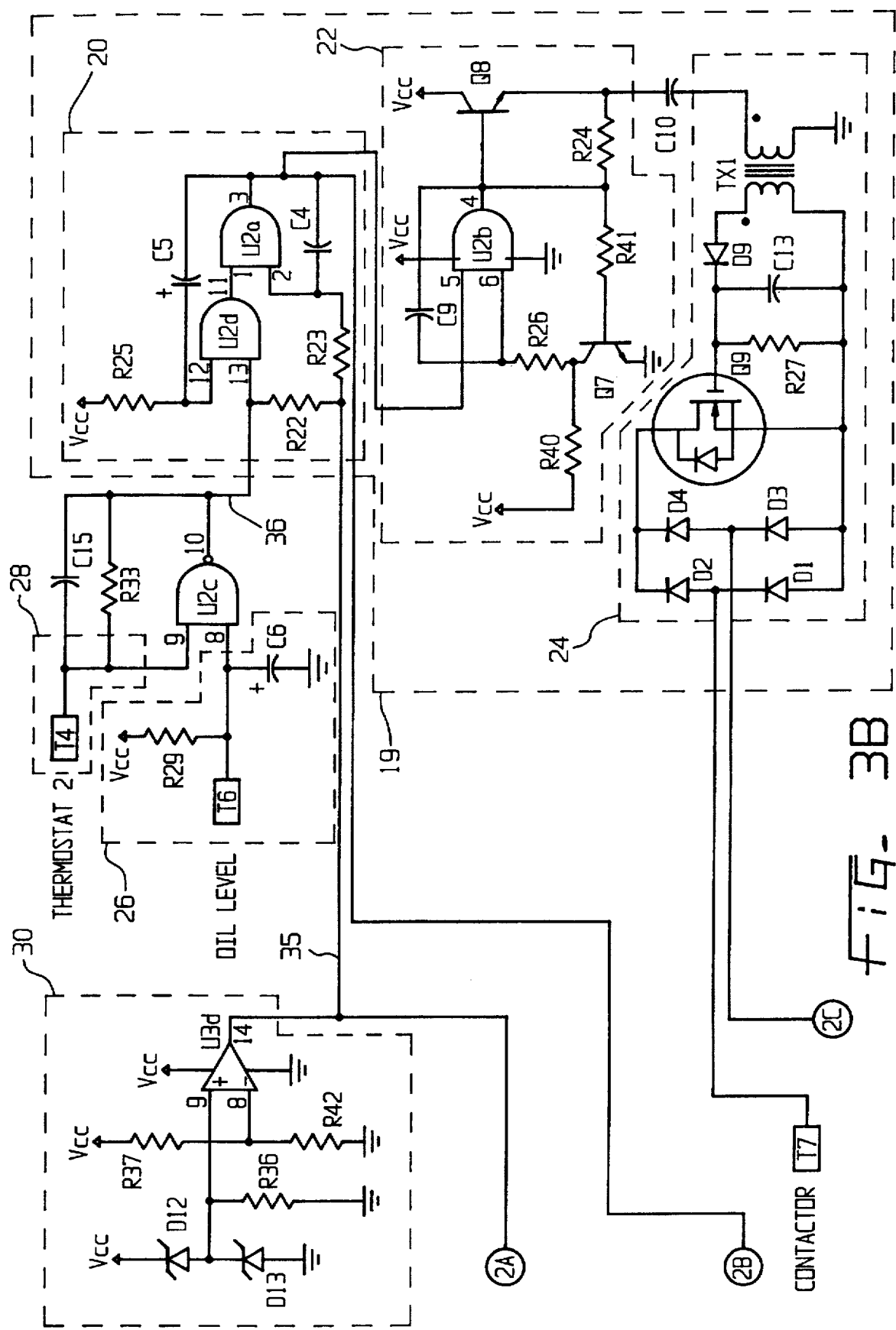
Figure 3C:
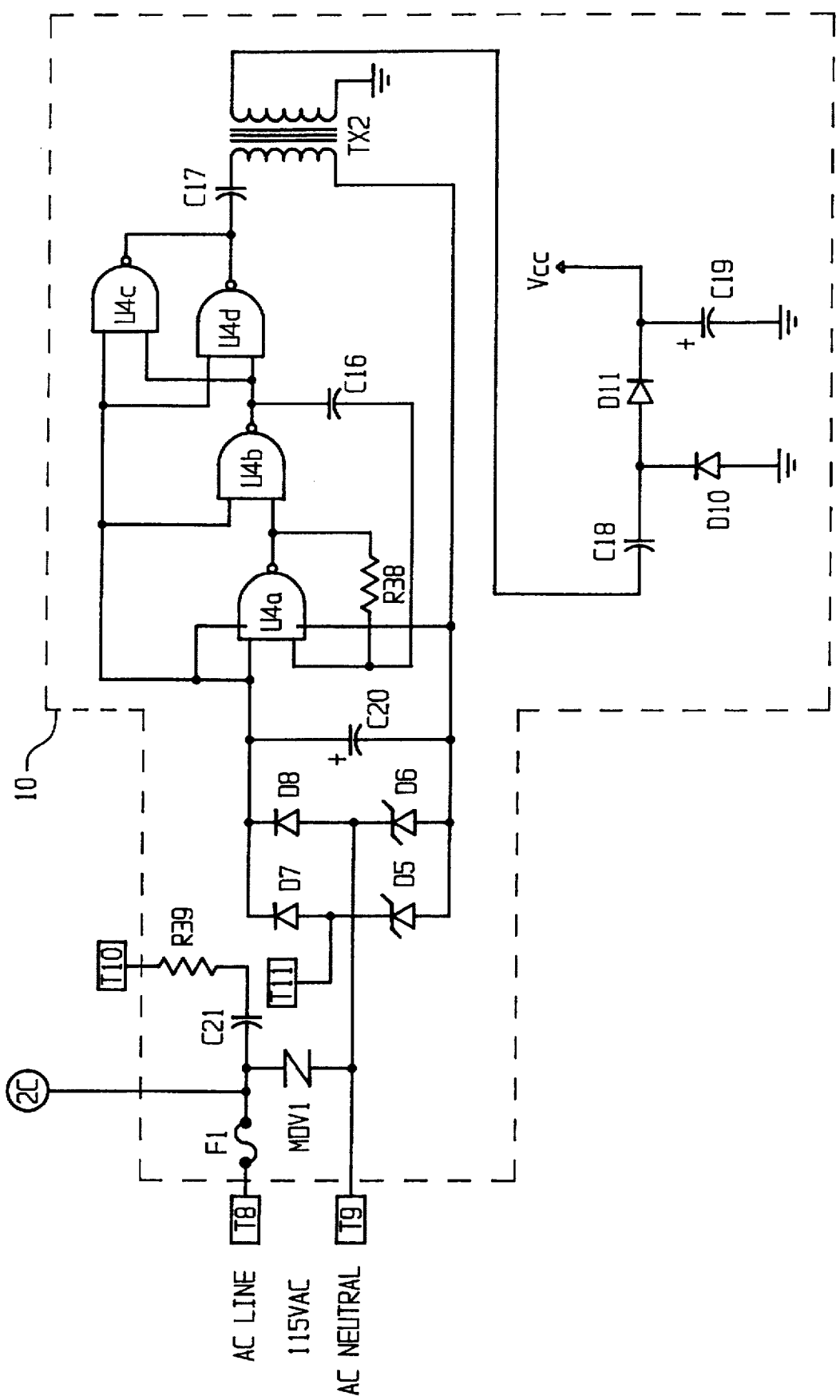

A detailed description of control and protection circuit 7 is now provided with references to FIGS. 3A–C. Power to compressor motor M1 is governed by the operation of current control circuit 19, which comprises protection timer 20, oscillator 22, and inductive coupling circuit 24, and contactor 25. Current control circuit 19 receives trip signals from signal lines 35 and 36. During normal operations, the inputs from signal lines 35 and 36 are high, i.e. at VCC, the output from protection timer 20 to oscillator 22 is high, and oscillator 22 provides a series of current pulses to inductive coupling circuit 24 to keep contactor 25, which is connected via terminal T7, closed. When a trip signal is received on signal line 35 or 36, i.e. the input from signal line 35 or 36 drops to ground level, the output from protection timer 20 goes low, deactivating oscillator 22, thereby interrupting the current pulses to inductive coupling circuit 24 and opening contactor 25 to interrupt current to compressor motor M1. If the trip signal is received on signal line 35, the output from protection timer 20 goes low after a predetermined time delay.

Protection timer 20 includes AND gates U2a and U2d operatively connected to signal lines 35 and 36. Pin 3 of AND gate U2a is connected to pin 5 of AND gate U2b and enables and disables oscillator 22. Signal line 35 is connected to pin 13 of AND gate U2d through resistor R22 and to pin 2 of AND gate U2a through resistor R23. Capacitor C4 is connected between pins 2 and 3 of AND gate U2a and capacitor C5 is connected between pin 3 of AND gate U2a and pin 12 of AND gate U2d. Signal line 36 is directly connected to pin 13 of AND gate U2d.

Under normal conditions, the input voltages to AND gate U2d and AND gate U2a are high, and capacitor C4 is charged to a high state. When a trip signal is received on line 35, i.e. voltage on line 35 drops to ground level, capacitor C4 discharges through resistor R23 at a rate based on the time constant R23*C4 and the input voltage to pin 2 of AND gate U2a drops accordingly. When the input to pin 2 of AND gate U2a drops below a threshold level, after about 1 sec. the output of pin 3 of AND gate U2a drops low. When the output of pin 3 of AND gate U2a goes low, the output of pin 4 of AND gate U2b also goes low deactivating oscillator 22 as described further below.

When a trip signal is received on line 36, it can be seen that the output of pin 11 of AND gate U2d goes low without any time delay, thereby also forcing the output of pin 3 of AND gate U2a to go low without any time delay. Line 36 may advantageously be connected to detector circuits which sense immediate danger conditions wherein the compressor motor requires immediate deactivation. One such immediate danger condition is a low oil level condition. Line 36 may also be connected to circuits which control routine activation and deactivation of the compressor motor wherein a time delay is not required, for example, routine cycling of the compressor motor to maintain a temperature range in a chamber.

Protection timer 20 also automatically restarts oscillator 22 after a predetermined time delay unless the trip condition persists or another trip signal is received on signal line 35 or 36. After a trip signal has been received and the output of pin 3 of AND gate U2a goes low, capacitor C5 begins to charge through R25. In the event of an overcurrent trip, the inputs to pin 13 of AND gate U2d and pin 2 of AND gate U2a jump back to a high state after the current to compressor motor M1 is interrupted. When capacitor C5 charges above a threshold level, the input to pin 12 of AND gate U2d goes to a high state, the output of pin 11 of AND gate U2d goes high, and the output of pin 3 of AND gate U2d goes high, thereby reactivating oscillator 22.

Oscillator 22 includes AND gate U2b having input pin 5 connected to the output of protection timer 20, input pin 6 operatively connected to the collector of transistor Q7 via resistor R26, and output pin 4 operatively connected to the bases of transistors Q7 and Q8. During normal operation, the output of pin 4 of U2b oscillates between the high and low states, turning transistor Q8 ON and OFF to provide current pulses to the primary winding of transformer TX1 through capacitor C10.

Initially, when both inputs to AND gate U2b are high and the output of pin 4 of AND gate U2b is high, transistors Q7 and Q8 are ON, i.e. in the conducting state. Since transistor Q7 is ON, capacitor C9 is able to discharge through resistor R26. As capacitor C9 discharges, the input voltage to pin 6 of AND gate U2b falls accordingly. When the input at pin 6 drops below a threshold value, the output of pin 4 of AND gate U2b drops low, thereby turning transistors Q7 and Q8 OFF. When transistor Q8 turns OFF, the current to the primary winding of transformer TX1 is interrupted. When transistor Q7 turns OFF, capacitor C9 begins to charge back up through VCC, resistors R40 and R26, and the input voltage to pin 6 of AND gate U2b begins to rise accordingly. When the input to pin 6 rises above a threshold level, the output of pin 4 of AND gate U2b goes high, transistors Q7 and Q8 turn ON, and the cycle is repeated. It can be seen that when the output from protection timer 20 is low, the input to pin 5 of AND gate U2b is low and the output of pin 4 of AND gate U2b remains low until the output from protection timer 20 goes back to the high state.

The current pulses from oscillator 22 are inductively coupled to FET Q9 through transformer TX1. Transformer TX1 comprises a bead type ferrite core with a single turn primary winding and a two turn secondary winding, however, it is to be understood that any suitable transformer arrangement for inductively coupling the current pulse to FET Q9 may be used. The current pulses to the primary winding of TX1 induces voltages in the secondary winding of TX1 which are rectified by diode D9 and applied to charging capacitor C13. The voltage on charging capacitor C13 biases the gate terminal of FET Q9 to switch FET Q9 to the ON state.

When oscillator 22 is enabled, the gate of FET Q9 is driven to a positive voltage of about 10 V and FET Q9 is turned ON, closing contactor 25 which is connected via terminal T7. When oscillator 22 is disabled, the charge on capacitor C13 is discharged via R27 and FET Q9 is turned OFF, opening contactor 25. The time constant R27*C13 is set high enough to prevent an excessively rapid turn OFF of FET Q9. Turning FET Q9 OFF too rapidly can generate high voltage in the contactor coil, thereby damaging FET Q9 which is susceptible to damage from high voltage in the OFF state. Contactor 25 comprises any conventionally known contactor arrangement suitable for enabling or interrupting current from an AC power supply to compressor motor M1. Power is supplied to contactor 25 from power supply 10 through diodes D1, D2, D3 and D4.

Current detector circuit 12 senses the current in the windings of compressor motor M1 and provides a current level signal corresponding to each current. Current detector circuit 12 comprises a plurality of current detectors, wherein each current detector is operatively associated with a phase winding of compressor motor M1. Each current detector includes a current sensing winding respectively associated with a phase winding and connected to terminals A, B or C.

Figure 5:
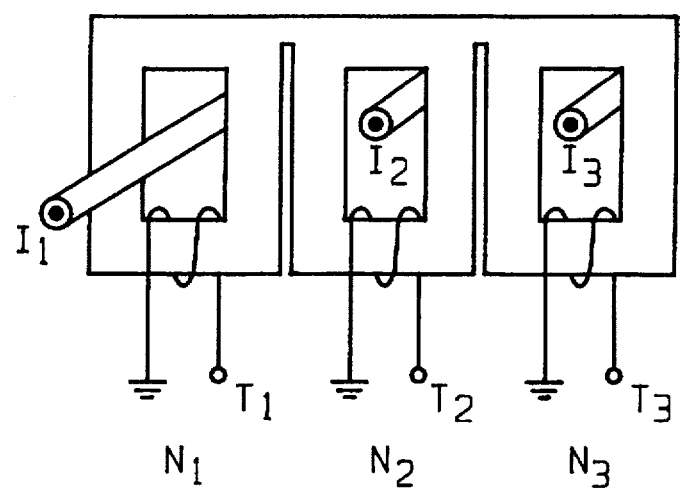
FIG. 5 is a perspective view of a current detector suitable for use in the present control and protection circuit.

A current detector suitable for use in the present control circuit is shown in FIG. 5, wherein motor leads L1, L2 and L3 are shown passing through windows of sensor S1, which are formed of laminated or other suitably arranged metallic material. Low-voltage sense windings N1, N2, and N3 are wound around the lower legs of the respective windows. The current detector may be disposed away from the casing of motor M1 thereby providing flexibility in the physical arrangement of the system. It can be seen that the present current detector arrangement provides several advantages. First, electrical isolation from the control circuit is provided. Since the three insulated motor leads pass through the windows of the sensor, there is no requirement for electrical connection of the high voltage motor leads to the control circuit. This configuration allows the low-voltage sense windings N1, N2, and N3 to be connected to a common control circuit. Second, no air gap is used in any of the three sections of the sensor. As such, this configuration provides uniformity of output voltages for the three phases when the three-phase current values are close to one another as for balanced three-phase operation.

Current flow through the motor windings causes a voltage to be generated in the respective current sensing winding and provided at terminals A, B or C. During normal operation, the current sensing windings provide an indication of the zero to peak current in the phase winding and provides a voltage on the order of several millivolts. The peak is negative relative to ground and accordingly reduces the input voltage to the respective comparator. A DC voltage corresponding to the phase winding current is impressed on the respective capacitors C1, C2 or C3 and is adjusted as necessary by the associated comparator and transistor arrangement as described below.

The operation of the current detectors are described with reference to the current detector of the phase winding associated with terminal A. The remaining current detectors for the remaining phases windings operate in the same manner. As noted above, the current through the motor winding associated with terminal A results in a corresponding DC voltage on capacitor C1. Capacitor C1 is charged when transistor Q1 is turned ON by comparator U1a. The voltage on capacitor C1 charges up to a level proportional to the current in the phase winding.

It can be seen that a circuit is formed from capacitor C1 to ground through resistors R1 and R2 and the current sensing winding. Thus, the input to pin 7 of comparator U1a is provided by a voltage divider formed by resistors R1 and R2. Under normal conditions, the input to pin 7 of comparator U1a is slightly higher than ground level, and the output of pin 1 of comparator U1a remains high. When the output of pin 1 of U1a is high, the bias provided to the base of transistor Q1 with R4 and R5 maintains transistor Q1 in the OFF state.

When the current in the phase winding exceeds the corresponding voltage signal on capacitor C1, the voltage at terminal A drops sufficiently to pull the input voltage on pin 7 of comparator U1a below ground level and the output of pin 1 of comparator U1a drops low as a result. When the output of pin 1 of comparator U1a goes low, transistor Q1 turns ON. When transistor Q1 turns ON, capacitor C1 charges through transistor Q1 to a higher voltage level until the input voltage on pin 7 rises sufficiently so that the output of pin 1 of comparator U1a returns to the high condition and turns transistor Q1 OFF. In this manner, a DC voltage corresponding to the current flowing through the corresponding phase winding of compressor motor M1 is produced and continuously updated on capacitor C1. The voltage signal is provided to comparator U1d through resistor R6.

Similarly, the current levels in the remaining phase windings are provided through respective resistors R12 and R18. Resistors R6, R12 and R18 provide isolation between the respective current detectors and pin 4 of comparator U1d. The output from resistors R6, R12 and R18 are combined into a single signal line and connected to pin 4 of comparator U1d. Thus, it can be seen that the input to pin 4 of comparator U1d corresponds to the average value of the currents flowing through each of the phase windings of compressor motor M1. Capacitor C11 filters the input to pin 4 of comparator U1d.

Resistor R3 is a relatively high resistance and forms a voltage divider with resistor R2 to maintain a slightly positive bias on input pin 7 of comparator U1a at all times. The slightly positive bias provides compensation for noise in the system to prevent comparator U1a from spurious states changes. Resistors R4 and R5 provide a bias to the base of transistor Q1. Resistor R4 eliminates leakage current in the emitter base of transistor Q1. As noted above, when the input to pin 7 drops below ground level, the output of pin 1 of comparator U1a goes low and transistor Q1 is turned ON.

Comparator U1d compares the average value of the motor winding currents provided by current detector circuit 12 with a predetermined current threshold level provided by current threshold circuit 15. Current threshold circuit 15 comprises a voltage divider having resistors R19, R20 and potentiometer P1. The current threshold level is provided to pin 5 of comparator U1d and may be selected by adjusting the wiper on potentiometer P1. Capacitor C12 filters the input to pin 5 of comparator U1d. When the combined current level signal from current detector circuit 12 is below the current threshold level, the output of pin 3 of comparator U1d is high. However, when an overcurrent condition exists, the combined current level signal from current detector circuit 12 exceeds the current threshold level and the output of pin 3 of comparator circuit 17 goes low thereby interrupting the current to compressor motor M1.

Protection from single phase operation is provided by single phase detector circuit 13 which comprises transistors Q4, Q5, Q6 respectively associated with capacitors C1, C2, C3, connected to the output of current threshold circuit 15 through resistor R21. When single phase operation occurs, the current in at least one of the phase winding ceases, or falls close to zero amps. Due to the loss in current through a phase winding, the average of the currents through all phase windings may decrease, but the current in a particular phase winding may increase. Since the average current level provided to comparator U1d has decreased, comparator U1d may not provide a trip signal even though current in a particular phase winding may be high. Therefore, single phase detector circuit 13 provides protection by lowering the current threshold level to comparator circuit U1d when single phase operation occurs.

The operation of single phase detector circuit 13 is described with reference to the current detector associated with terminal A. The remaining current detectors operate in a similar fashion. As noted above, single phase detector circuit 13 comprises resistor R21 connected to the collectors of transistors Q4, Q5, Q6 which are in turn operatively connected to capacitors C1, C2 and C3, respectively, of current detector circuit 12. When single phase operation occurs, capacitor C1 is discharged through resistors R1, R2 and the current sensing winding associated with terminal A, and transistor Q4 turns ON. When transistor Q4 turns ON, resistor R21 is connected to ground in parallel with a portion of potentiometer P1 and resistor R20. The parallel resistance connection results in a lower current threshold value being applied to pin 5 of comparator U1d. Therefore, during single phase operations, even with normal currents flowing through the remaining phase windings, the reduced current threshold level causes the output of pin 3 of comparator U1d to go low.

Protection from light loading condition is provided by light load detector circuit 14 which also uses the output of the current detectors in current detector circuit 12 to provide a trip signal when light loading condition occurs. Light load detector circuit 14 comprises comparator U3c having pin 11 connected to transistors Q4, Q5 and Q6, which respectively include base terminals connected to capacitors C1, C2 and C3. By this arrangement, the voltages at the emitter terminals of transistors Q4, Q5 and Q6, and thus the input voltage to pin 11, are only slightly higher than the voltages at the respective base terminals of transistors Q4, Q5, and Q6. The input at pin 11 is compared with a light loading threshold level provided at pin 10. The light loading threshold level is provided by a voltage divider comprising resistor R31 and potentiometer P2 and set by adjusting the wiper on potentiometer P2. Comparator U3c provides a trip signal on signal line 35 when the voltage on pin 11 drops below the light loading threshold level on pin 10.

During normal operation, the voltages at the emitter terminals of Q4, Q5 and Q6 are sufficiently high to maintain the input to pin 11 above the light loading threshold level. When a light loading condition occurs, the current in each of the phase windings is relatively low and the DC voltages on capacitors C1, C2 and C3 drop to a correspondingly low value. The drop in voltage on capacitor C1, C2 and C3 correspondingly drops the input to pin 11 of comparator U3c. When the input to pin 11 drops below the light loading threshold provided at pin 10, the output of pin 13 of comparator U3c goes low thereby providing a trip signal to current control circuit 19 via signal line 35.

It can be seen that the present light loading protection arrangement allows control and protection circuit 7 to respond to the smallest of the three currents. An advantage of this type of response is that the circuit can provide effective protection against operation at light loads where percentage phase current unbalance is high, particularly during loss of refrigerant charge, without the long time delay associated with sensing the motor winding temperatures.

The voltage divider associated with the light loading threshold level is connected to pin 3 of AND gate U2a to enable control and protection circuit 7 to restart compressor motor M1 after compressor motor M1 has been shut down. It can be seen that when compressor motor M1 trips, the output of pin 3 of AND gate U2a goes to ground level, thereby setting the light loading threshold to zero and effectively deactivating light load detector circuit 14. Deactivation of light load detector circuit 14 is required as the light loading threshold level would otherwise prevent the restart of compressor motor M1. Light load detector circuit 14 is effectively reactivated when the output of pin 3 of AND gate U2a returns to the high state. Thus, the present arrangement prevents control and protection circuit 7 from locking in an OFF condition.

Protection from high motor winding temperature is provided by motor temperature detector circuit 16. Motor temperature detector circuit 16 comprises comparator U3a which compares an output from a temperature sensor with a motor temperature threshold level and provides a trip signal when the sensed temperature exceeds the motor temperature threshold level. Motor temperature detector circuit 16 provides a trip signal to signal line 35 via the output of pin 1 of comparator U3a.

The temperature sensor may be either a positive temperature coefficient (PTC) or a negative temperature coefficient (NTC) thermistor connected to terminal T5. In either case, the sensing device is placed in thermal contact with the motor windings and is connected between terminal T5 and ground. If silicon diodes or NTC thermistors are used, jumpers J1 and J2 are placed in the solid line positions such that the voltage signal provided by the voltage divider comprising resistor R28 and the NTC thermistor is provided to non-inverting input pin 7 of comparator U3a and the temperature threshold level signal is provided to inverting input pin 6 of comparator U3a. Thus, as the temperature of the motor winding increases, the resistance of the NTC thermistor decreases and the voltage signal to pin 7 decreases. When the temperature of the motor winding rises above the predetermined temperature threshold, the voltage signal at pin 7 falls below the threshold signal at pin 6 and the output of pin 1 of U3a goes low, thereby providing a trip signal on signal line 35.

If PTC thermistors are used, J1 and J2 are placed in the dotted positions, such that the voltage signal provided by the voltage divider comprising resistor R28 and the PTC thermistor is provided to pin 6 of comparator U3a and the output of the temperature threshold circuit is provided to pin 7 of comparator U3a. As the temperature of the motor winding increases, the resistance of the PTC thermistor increases, thereby increasing the voltage signal provided to pin 6. When the motor winding temperature increases above the predetermined temperature threshold level, the voltage signal at pin 6 exceeds the threshold signal at pin 7 and the output of pin of comparator U3a goes low, again providing a trip signal on signal line 35.

The motor temperature threshold level is provided by a voltage divider comprising resistor R32 and potentiometer P3 and is selected by adjusting the wiper on potentiometer P3. Resistor R30 is connected between pin 7 of comparator U3a and pin 3 of AND gate U2a to provide a hysteresis between the trip and reset points. Due to the hysteresis, the high temperature trip setpoint is higher than the reset point. The hysteresis prevents excessive chattering of the contactor when the sensed temperature is near the motor temperature threshold level. The width of the hysteresis is selected by adjusting the value of resistor R30.

Protection against overheating in any other part of the compressor, such as the housing or the discharge line, is provided by component temperature detector circuit 18. Component temperature detector circuit 18 comprises comparator U3b which compares an output from a temperature detector placed in contact with the component of interest, and a component temperature threshold level and provides a trip signal on signal line 35 when the sensed temperature exceeds the component temperature threshold level.

The temperature detector in the present embodiment comprises silicon diode D14, but may also comprise an NTC thermistor. The temperature threshold level is provided by a voltage divider circuit comprising resistors R32, R34, R35 and potentiometer P3 and may be selected by adjusting the wiper on potentiometer P3. Resistor R43 is connected between pin 5 of comparator U3b and pin 3 of U2a to provide a hysteresis between the trip and reset levels of component temperature detector circuit 18. Again, the built-in hysteresis prevents excessive chattering of the contactor when the component temperature is near the component temperature threshold level.

Protection from power supply undervoltage is provided by power supply undervoltage detector circuit 30. Power supply undervoltage detector circuit 30 comprises comparator U3d which compares inputs corresponding to the power supply voltage and the power supply voltage threshold level and provides a trip signal on signal line 35 when the sensed voltage falls below the power supply voltage threshold level. The power supply voltage is provided to pin 9 of comparator U3d by a circuit comprising zener diode D12 and zener diode D13 in parallel with resistor R36. The power supply voltage threshold level is provided to pin 8 by a voltage divider comprising resistors R37 and R42.

When the power supply voltage is sufficiently high, zener diodes D12 conducts and a voltage which corresponds to VCC—voltage of zener diode D12 is provided to pin 9 of comparator U3d. Under normal conditions, this input voltage exceeds the power supply voltage threshold level provided at pin 8, and thus the output of pin 14 of comparator U3d is high. However, when the power supply voltage drops below a predetermined threshold, zener diodes D12 and D13 are cut off and the input at pin 9 is below the power supply voltage threshold level provided at pin 8 and the output of pin 14 goes low, thereby providing a trip signal on signal line 35.

It is to be understood that zener diode D13 may be replaced with a conventional diode having the cathode connected to ground. In such a configuration, zener diode D13 is selected to have a rating of 10 V and the resistance values of R36, R37 and R42 are selected as necessary. Thus, when the zener diode D13 conducts, the small voltage created across resistor R36 is applied to pin 9 and compared with the voltage threshold provided on pin 8.

Power supply undervoltage protection is necessary to protect FET Q9 and contactor 25 connected to terminal T7.

Attempting to turn FET Q9 ON when the power supply voltage is too low may result in burning out FET Q9 as FET Q9 requires an adequate voltage on the gate terminal. Also, if insufficient voltage is applied to the contactor connected to terminal T7, the contactor may not adequately turn ON. Therefore, power supply undervoltage detector circuit 30 ensures that adequate power supply voltage exists before current control circuit 19 is enabled.

Protection against low oil level in the compressor motor is provided by oil level detector circuit 26 which is coupled to pin 8 of AND gate U2c. The output of pin 10 of AND gate U2c is connected to signal line 36 which is connected AND gate U2d of protection timer 20. In the present embodiment, the oil level detector comprises a phototransistor which is connected between terminal T6 and ground. It is to be understood that terminal T6 in FIG. 3B represents the terminal connection and the phototransistor connected thereon. The phototransistor is also coupled to an infrared LED which is connected to terminals T10 and T11. Again, it is to be understood that terminals T10 and T11 represent the terminal connections and the infrared LED connected thereon. The infrared LED is connected in inverse parallel with a diode of the IN4001 type. Thus, the current which provides the power supply voltage also acts as a current source for the LED of the oil level detector. This arrangement provides a significant cost advantage for the present control and protection circuit.

The infrared LED and phototransistor are mounted on a glass prism (not shown) which extends through the compressor wall. When the oil level is sufficiently high, the prism is totally submerged in the oil and no light is received at the phototransistor, thus the input to pin 8 of AND gate U2c remains high due to the charging of capacitor C6 through resistor R29.

When the oil level drops below a threshold level, light from the infrared LED reaches the phototransistor, turning the phototransistor ON and providing a path to ground, thereby pulling the input to pin 8 of AND gate U2c low. A low input to AND gate U2c results in a trip signal on signal line 36. As noted above, the trip signal on signal line 36 results in the deactivation of current control circuit 19 and the opening of contactor 25 without a time delay.

Compressor motor M1 is also cycled as necessary to maintain the desired temperature in a chamber by chamber temperature detector circuit 28. Chamber temperature detector circuit 28 includes a temperature detector, such as a thermostat, disposed inside the chamber and connected to terminal T4, which provides a signal to pin 9 of AND gate U2c to activate and deactivate compressor motor M1 as necessary.

Power supply circuit 10 is illustrated in FIG. 3C and includes a plurality of logic gates U4a–d coupled with transformer TX2. Terminals T8 and T9 are connected to an AC power source and terminals T10 and T11 are connected to provide power to the infrared LED associated with oil level detector circuit 26. The AC power source drives capacitor C21 resulting in a 60 Hz current in capacitor C21. Diodes D5, D6, D7 and D8 charge capacitor C20 and regulate the maximum voltage on capacitor C20 to about 1 volt less than the rating on the zener diodes. NAND gates U4a and U4b form a square wave oscillator and drive NAND gates U4b and U4c which provide an output to the primary winding of transformer TX2 through capacitor C17. Transformer TX2 comprises a ferrite bead core with a four turn primary winding and a four turn secondary winding, however it is to be understood that any suitable transformer may be used. The inductive coupling provided through the use of the NAND gates and transformer TX2 provides isolation between the DC supply and the AC power line. The ground indicated on FIG. 3C is connected to the compressor housing which is in turn connected to building ground. This arrangement allows the compressor housing to act as one of the terminals for thermistor sensing of the compressor motor winding temperature.

In summary, control and protection circuit 7 provides protection against a number of conditions including: overcurrent, single phase operation, light loading, high compressor motor winding temperature, high compressor motor component temperature, power supply undervoltage, and low oil level. Control and protection circuit 7 also provides for cycling compressor motor M1 during normal operation based on the temperature in chamber 4. Control and protection circuit 7 includes oscillator 22 and inductive coupling circuit 24 which provide isolation between the detectors and portions of control and protection circuit from the power supply circuit and the contactor. Control and protection circuit 7 also includes protection timer 20 which provides a predetermined time delay when a trip signal is received from certain detectors and also restarts compressor motor M1 upon a trip event, unless the trip condition persists or another trip signal is generated. It can be seen that these functions and features are provided in a compact, efficient package as described above.

Figure 4A:
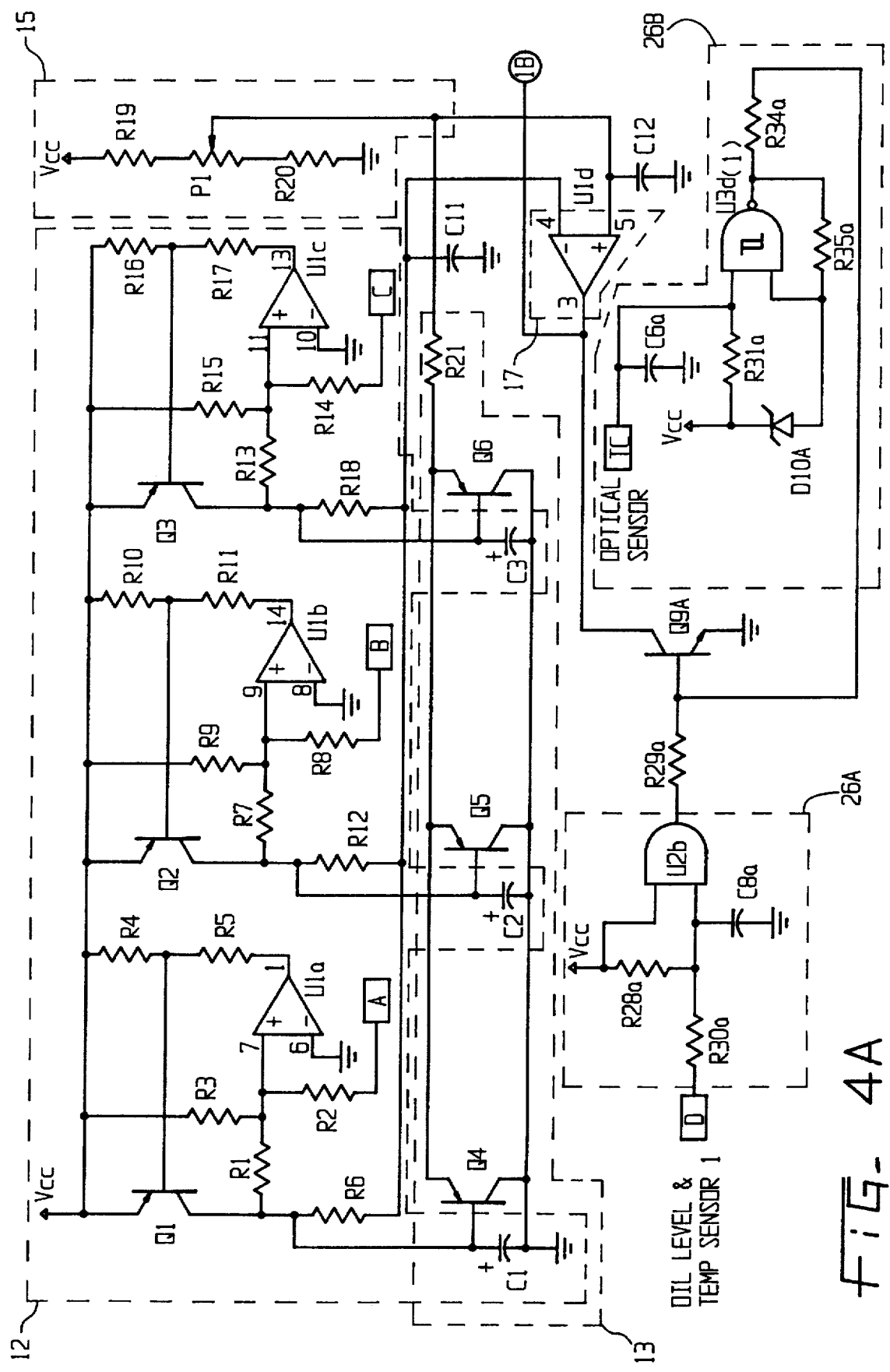
FIGS. 4A–B form a schematic circuit diagram of an alternative embodiment of the control and protection circuit of the present invention.
Figure 4B:
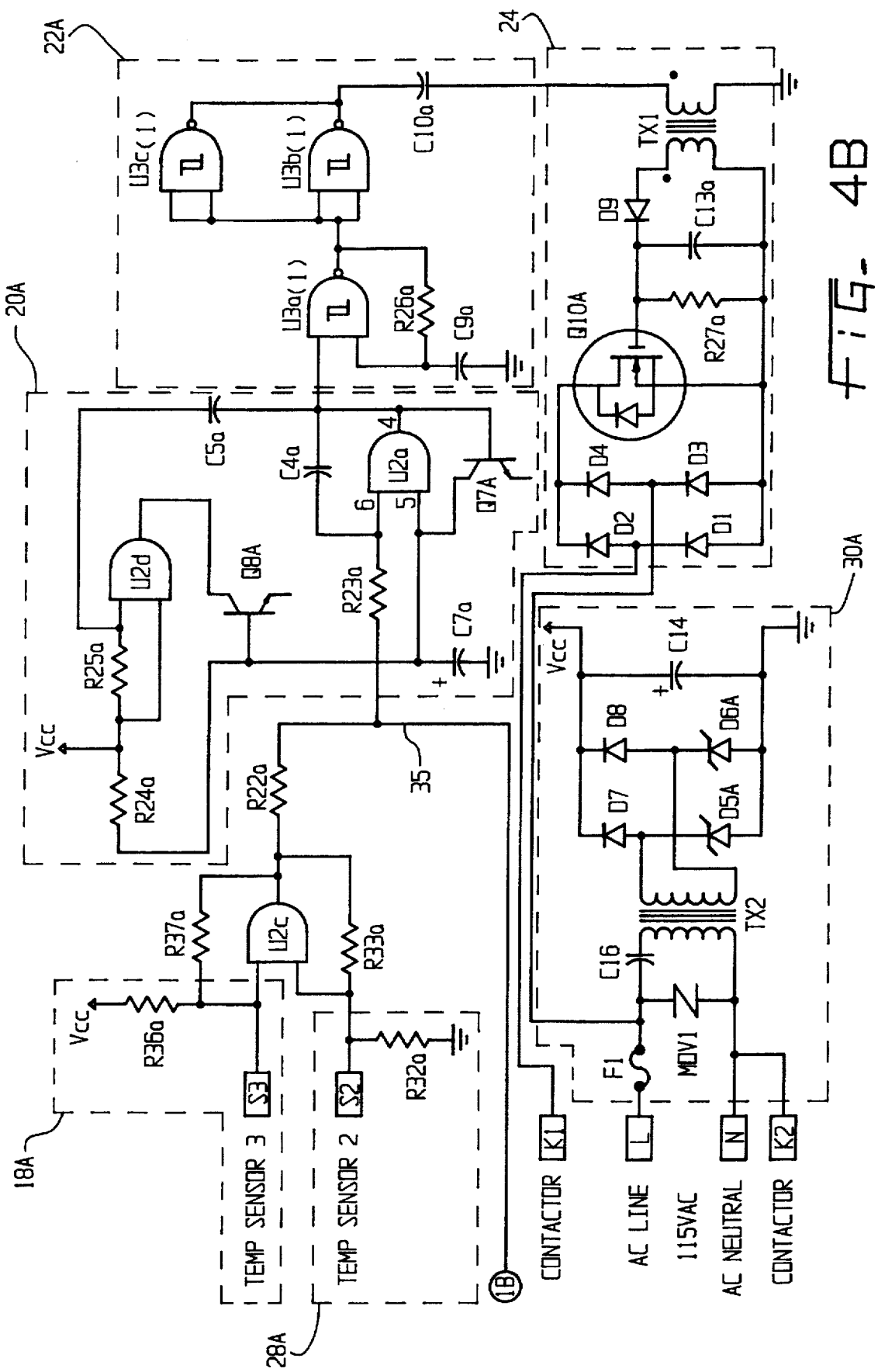

FIGS. 4A–B illustrate an alternative embodiment of the present control and protection circuit. The alternative embodiment also includes current detector circuit 12, single phase detector circuit 13, current threshold detector 15, comparator circuit 17 and inductive coupling circuit 24 which are similar to the embodiment illustrated in FIGS. 3A–C. The alternative embodiment illustrated in FIGS. 4A–C also include protection timer 20A and oscillator 22A which perform functions similar to protection timer 20 and oscillator 22, but use a different logic configuration. It can be seen that protection timer 20 and oscillator 22 use a more compact arrangement with a smaller number of logic gates. DC voltage is provided by power supply circuit 10A which does not include a square wave oscillator as in the embodiment illustrated in FIGS. 3A–C.

The alternative embodiment also comprises a plurality of detector circuits including oil level and temperature sensor circuit 26A, optical oil level sensor circuit 26B which provides an alternative method of detecting oil level, motor component temperature detecting circuit 18A and chamber temperature detecting circuit 28A. It can be seen that a trip signal generated by the detector circuits provides a trip signal on first signal line 35 which turns OFF the output of protection timer 20A after a predetermined time delay set by resistor R23 and capacitor C4. Turning the output of protection timer 20A OFF deactivates oscillator 22A which deactivates the inductive coupling and opens contactor 25 connected via terminal T7 to interrupt current to the compressor motor.

The present invention may be practiced by using the following:

| | |
|---|---|
| R1 | 100 KΩ |
| R2 | 499 Ω |
| R3 | 10 MΩ |
| R4 | 100 KΩ |
| R5 | 100 KΩ |
| R6 | 100 KΩ |
| R7 | 100 KΩ |
| R8 | 499 Ω |
| R9 | 10 MΩ |
| R10 | 100 KΩ |
| R11 | 100 KΩ |
| R12 | 100 KΩ |
| R13 | 100 KΩ |
| R14 | 499 Ω |
| R15 | 10 MΩ |
| R16 | 100 KΩ |
| R17 | 100 KΩ |
| R18 | 100 KΩ |
| R19 | 30.1 KΩ, 1% |
| R20 | 30.1 KΩ, 1% |
| R21 | 20K to 100 KΩ |
| R22 | 100 KΩ |
| R22a | 100 KΩ |
| R23 | 10 MΩ |
| R23a | 10 MΩ |
| R24 | 1 KΩ |
| R24a | 4.7 MΩ |
| R25 | 4.7 MΩ |
| R25a | 10 MΩ |
| R26 | 470 KΩ |
| R26a | 270 KΩ |
| R27 | 2.2 MΩ |
| R27a | 2.2 MΩ |
| R28 | 100 KΩ, 1% |
| R28a | 2.2 MΩ |
| R29 | 100 KΩ |
| R29a | 1 MΩ |
| R30 | 210 KΩ, 1% |
| R30a | 330 KΩ |
| R31 | 200 KΩ, 1% |
| R31a | 100 KΩ |
| R32 | 200 KΩ, 1% |
| R32a | 100 KΩ |
| R33 | 270 KΩ |
| R33a | 270 KΩ |
| R34 | 330 KΩ, 1% |
| R34a | 1 MΩ |
| R35 | 200 KΩ, 1% |
| R36 | 100 KΩ |
| R36a | 10 KΩ |
| R37 | 100 KΩ |
| R37a | 33 KΩ |
| R38 | 15 KΩ |
| R39 | 150 Ω |
| R40 | 100 KΩ |
| R41 | 1.0 MΩ |
| R42 | 100 KΩ |
| R43 | 210 KΩ, 1% |
| R44 | 100 KΩ, 1% |
| C1 | 2.2 µF |
| C2 | 2.2 µF |
| C3 | 2.2 µF |
| C4 | 0.1 µF |
| C4a | 0.1 µF |
| C5 | 22 µF |
| C5a | 0.1 µF |
| C6 | 2.2 µF |
| C6a | 0.1 µF |
| C7 | 0.1 µF |
| C7a | 2.2 µF |
| C8 | 0.1 µF |
| C8a | 0.1 µF |
| C9 | 330 µF |
| C9a | 50 pF |
| C10 | 0.01 µF |
| C10a | 0.001 µF |
| C11 | 0.1 µF |
| C11a | 0.1 µF |
| C12 | 0.01 µF |
| C12a | 0.01 µF |
| C13 | 0.01 µF |
| C13a | 0.1 µF |
| C14 | 0.1 µF |
| C14a | 1,000 µF |
| C15 | 0.1 µF |
| C16 | 22 pF |

-continued

| | |
|---|---|
| C17 | 0.001 μF |
| C18 | 0.01 μF |
| C19 | 220 μF |
| C20 | 220 μF |
| C21 | 0.47 μF |
| D1 | 1N4004 |
| D2 | 1N4004 |
| D3 | 1N4004 |
| D4 | 1N4004 |
| D5 | 1N5245 |
| D5a | 1N4744 |
| D6 | 1N4245 |
| D6 | 1N4744 |
| D7 | 1N4001 |
| D8 | 1N4001 |
| D9 | 1N4148 |
| D10 | 1N4148 |
| D10a | 1N5234 |
| D11 | 1N4148 |
| D12 | 1N5231 |
| D13 | 1N5231 |
| D14 | 1N4001 |
| Q1 | 2N4403 |
| Q2 | 2N4403 |
| Q3 | 2N4403 |
| Q4 | 2N4403 |
| Q5 | 2N4403 |
| Q6 | 2N4403 |
| Q7 | 2N4401 |
| Q7a | 2N3904 |
| Q8 | 2N4401 |
| Q8a | 2N3904 |
| Q9 | 1RF720 |
| Q9a | 2N3904 |
| Q10a | 1RF620 |
| U1A | LM339AN |
| U1B | LM339AN |
| U1C | LM339AN |
| U1D | LM339AN |
| U3A | LM339AN |
| U3B | LM339AN |
| U3C | LM339AN |
| U3D | LM339AN |
| U2A | CD4081 |
| U2B | CD4081 |
| U2C | CD4081 |
| U2D | CD4081 |
| U3A(1) | CD4093 |
| U3B(1) | CD4093 |
| U3C(1) | CD4093 |
| U3D(1) | CD4093 |
| U4A | CD4011 |
| U4B | CD4011 |
| U4C | CD4011 |
| U4D | CD4011 |
| P1 | 100 KΩ |
| P2 | 100 KΩ |
| P3 | 100 KΩ |

While this invention has been described as having an exemplary design, the present invention may be further modified within the spirit and scope of this disclosure. Thus, it should be understood that the signals generated by the circuitry of the present invention may take many forms, such as voltage levels as disclosed, logic levels, polarity, current levels, etc. This application is therefore intended to cover any variations, uses, or adaptations of the invention using its general principles. Further, this application is intended to cover such departures from the present disclosure as come within known or customary practice in the art to which this invention pertains.

What is claimed is:

1. A control and protection circuit for a compressor motor having a plurality of motor windings, comprising:

a current detector circuit having a plurality of current detectors, each said current detector associated with a winding of the compressor motor and having an output, each said current detector output providing a current level signal corresponding to the current in the respective winding, said current detector circuit having means connected to said current detector outputs for combining said current level signal in a predetermined manner to provide a combined current level signal;

a switch circuit disposed between the compressor motor and an AC power source, said switch circuit changeable between a first state which allows current to the compressor motor and a second state which interrupts current to the compressor motor; and a current control circuit disposed between said current detector circuit and said switch circuit, said current control circuit including an oscillator having a logic gate with an input operatively connected to said current detector circuit and an output connected to control a first solid state switch adapted to provide an oscillating output and an inductive coupling circuit having an inductive coupling element with an input connected to said first solid state switch output and an output connected to a second solid state switch, said second solid state switch adapted to place said switch circuit in said first state in response to the presence of said oscillating output and in said second state in response to the absence of said oscillating output, said current control circuit activated to provide said oscillating output from said oscillator and enable said inductive coupling circuit and place said switch circuit in said first state when said combined current level signal is below a predetermined current threshold level, said current control circuit deactivated to interrupt said oscillating output from said oscillator and disable said inductive coupling circuit and place said switch circuit in said second state when said combined current level signal exceeds said predetermined current threshold level.

2. The control and protection circuit according to claim 1, wherein each said current detector comprises a current sensing winding disposed about the respective motor winding, said current sensing winding providing a voltage signal in response to the flow of current in said respective winding.

3. The control and protection circuit according to claim 2, wherein each said current detector comprises a capacitor connected in series with said current sensing winding to ground level, and a solid state switch operatively connected to said capacitor to control the charging of said capacitor, said capacitor charged to a voltage level corresponding to the current in said respective winding by said solid state switch in response to said voltage signal from said current sensing winding.

4. The control and protection circuit according to claim 3, wherein said combined current level signal corresponds to an average of said current level signals.

5. The control and protection circuit according to claim 4, further comprising a first signal line connected between said current control circuit and said current detector circuit, said first signal line adapted to provide a first trip signal to said current control circuit, said current detector circuit providing said first trip signal on said first signal line when said combined current level signal exceeds said predetermined current threshold level, said current control circuit deactivated to interrupt said oscillating output from said oscillator and disable said inductive coupling circuit and place said switch circuit in said second state in response to the presence of said first trip signal on said first signal line.

6. The control and protection circuit according to claim 5, further comprising a first comparator having a first input operatively connected to said means for combining said current level signals to receive said combined current level signal, a second input connected to a current threshold circuit and an output connected to said first signal line, said current threshold circuit providing a current threshold signal corresponding to said predetermined current threshold level, said first comparator providing said first trip signal on said first comparator output when said combined current level signal exceeds said predetermined current threshold level.

7. The control and protection circuit according to claim 6, further comprising a single phase detector circuit having an input connected to said current detector circuit and an output connected to said current threshold circuit, said single phase detector circuit reducing said current threshold signal provided to said first comparator when the current in any one of the plurality of windings substantially ceases.

8. The control and protection circuit according to claim 7, further comprising a light load detector circuit having an input operatively connected to said current detector circuit and an output connected to said first signal line, said light load detector providing said first trip signal on said first signal line when any one of said current level signals is less than a predetermined light loading threshold level.

9. The control and protection circuit according to claim 8, further comprising a motor winding temperature detector circuit having an input connected to a temperature detector in thermal contact with one of said windings and an output connected to said first signal line, said temperature detector providing a winding temperature signal corresponding to a temperature of said one winding, said motor winding temperature detector circuit providing said first trip signal on said first signal line when said winding temperature signal exceeds a predetermined winding temperature threshold level.

10. The control and protection circuit according to claim 9, further comprising a motor component temperature detector circuit having an input connected to a temperature detector in thermal contact with a selected motor component and an output connected to said first signal line, said motor component temperature detector providing a component temperature signal corresponding to a temperature of said selected component, said component temperature detector circuit providing said first trip signal on said first signal line when said component temperature signal exceeds a predetermined component temperature threshold level.

11. The control and protection circuit according to claim 10, further comprising a power supply undervoltage detector circuit having an input connected to a power supply and an output connected to said first signal line, said power supply providing a power supply voltage signal corresponding to a voltage provided by said power supply, said power supply undervoltage detector circuit providing said first trip signal on said first signal line when said power supply voltage signal is below a predetermined power supply voltage threshold level.

12. The control and protection circuit according to claim 11, wherein said current control circuit deactivates said inductive coupling circuit and places said switch circuit in said second state after a predetermined time delay in response to the presence of said first trip signal on said first signal line.

13. The control and protection circuit according to claim 12, further comprising a second signal line connected to said current control circuit and means for detecting immediate danger conditions on the compressor motor, said second signal line adapted to provide a second trip signal to said current control circuit in response to the presence of said immediate danger conditions, said current control circuit immediately interrupting said oscillating output from said oscillator and disabling said inductive coupling circuit and placing said switch circuit in said second state in response to the presence of said second trip signal on said second signal line.

14. The control and protection circuit according to claim 13, wherein said means for detecting immediate danger conditions comprises a second logic gate having an input connected to a low oil level detector circuit having an oil level detector disposed in an oil container associated with the compressor motor and an output connected to said second signal line, said oil level detector providing a low oil level signal in response to a predetermined low oil level in said oil container, said means for detecting immediate danger conditions providing said second trip signal on said second signal line in response to the presence of said low oil level signal.

15. The control and protection circuit according to claim 14, wherein said oil level detector comprises a phototransistor coupled to an infrared LED.

16. The control and protection circuit according to claim 15, further comprising a chamber temperature detector circuit having an input connected to a chamber temperature detector disposed in a chamber to be cooled and an output connected to said means for detecting immediate danger conditions, said chamber temperature detector providing a chamber temperature signal corresponding to a temperature in said chamber, said means for detecting immediate danger conditions providing said second trip signal on said second signal line when said chamber temperature signal exceeds a predetermined chamber temperature threshold level.

17. The control and protection circuit according to claim 16, wherein said current control circuit comprises a protection timer disposed between said first and second signal lines and said inductive coupling circuit, said protection timer including a first RC circuit to provide said predetermined time delay and a second RC circuit to reactivate said inductive coupling circuit after a second predetermined time delay when said switch circuit is placed in said second state.

18. The control and protection circuit according to claim 1, wherein each said current detector comprises a sensing winding respectively disposed around a portion of a window of a current sensor, each said window having a motor lead extending therethrough whereby current through each said motor lead produces a corresponding signal in said respective sensing winding.

19. A refrigeration system for cooling a chamber, comprising:

a chamber to be cooled;

a heat exchanger adapted to provide cooling for circulated air;

a fan adapted to circulate said cooling air through said heat exchanger and the refrigeration system;

a compressor having a motor with a plurality of windings; and a control and protection circuit operatively connected to said compressor motor, said control and protection circuit comprising, a current detector circuit having a plurality of current detectors, each said current detector associated with a winding of the compressor motor and having an output, each said current detector output providing a current level signal corresponding to the current in the respective winding, said current detector circuit having means connected to said current detector outputs for combining said current level signal in a predetermined manner to provide a combined current level signal, a switch circuit disposed between the compressor motor and an AC power source, said switch circuit changeable between a first state which allows current to the compressor motor and a second state which interrupts current to the compressor motor, and a current control circuit disposed between said current detector circuit and said switch circuit, said current control circuit including an oscillator having a logic gate with an input operatively connected to said current detector circuit and an output connected to control a first solid state switch adapted to provide an oscillating output and an inductive coupling circuit having an inductive coupling element with an input connected to said first solid state switch output and an output connected to a second solid state switch, said second solid state switch adapted to place said switch circuit in said first state in response to the presence of said oscillating output and in said second state in response to the absence of said oscillating output, said current control circuit activated to provide said oscillating output from said oscillator and enable said inductive coupling circuit and place said switch circuit in said first state when said combined current level signal is below a predetermined current threshold level, said current control circuit deactivated to interrupt said oscillating output from said oscillator and disable said inductive coupling circuit and place said switch circuit in said second state when said combined current level signal exceeds said predetermined current threshold level.

20. The control and protection circuit according to claim 19, wherein each said current detector comprises a capacitor connected in series with a current sensing winding associated with a phase winding to ground level, and a solid state switch operatively connected to said capacitor to control the charging of said capacitor, said capacitor charged to a voltage level corresponding to the current in said respective winding by said solid state switch in response to said voltage signal from said current sensing winding, said combined current level signal corresponding to an average of said current level signals.

21. The refrigeration system according to claim 20, further comprising means for detecting single phase conditions disposed between said current detector circuit and said current control circuit, said single phase detection means deactivating said current control circuit to interrupt said oscillating output from said oscillator and disable said inductive coupling circuit and place said switch circuit in said second state when current in one of said plurality of windings substantially ceases.

22. The refrigeration system according to claim 21, further comprising means for detecting light loading conditions disposed between said current detector circuit and said current control circuit, said light loading detection means deactivating said current control circuit to interrupt said oscillating output from said oscillator and disable said inductive coupling circuit and place said switch circuit in said second state when the current in one of said plurality of windings is below a predetermined light loading threshold level.

* * * * *